US007496799B2

(12) United States Patent
Prang et al.

(10) Patent No.: US 7,496,799 B2
(45) Date of Patent: Feb. 24, 2009

(54) SYSTEM AND METHOD FOR MONITORING THE PERFORMANCE OF A SERVER (75) Inventors: Bruce Prang, Woodinville, WA (US); Dmitry Sonkin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 76 days.

(21) Appl. No.: 11/592,652

(22) Filed: Nov. 3, 2006

(65) Prior Publication Data
US 2007/0055916 A1 Mar. 8, 2007

Related U.S. Application Data (63) Continuation of application No. 10/439,254, filed on May 15, 2003, now Pat. No. 7,155,641.

(51) Int. Cl.
G06F 11/00 (2006.01)
(52) U.S. Cl. .......................................... 714/47; 709/224
(58) Field of Classification Search .................. 714/38, 714/47, 45; 709/224
See application file for complete search history.

(56) References Cited

U.S. PATENT DOCUMENTS

| | | | | |
|---|---|---|---|---|
| 5,459,837 | A | 10/1995 | Caccavale | 395/184.01 |
| 6,079,033 | A | 6/2000 | Jacobson et al. | 714/47 |
| 6,449,739 | B1* | 9/2002 | Landan | 714/47 |
| 6,480,977 | B1 | 11/2002 | Apisdorf et al. | 714/712 |
| 6,631,409 | B1 | 10/2003 | Watson et al. | 709/224 |
| 6,738,933 | B2* | 5/2004 | Fraenkel et al. | 714/47 |
| 6,754,664 | B1 | 6/2004 | Bush | 707/102 |
| 6,792,460 | B2 | 9/2004 | Oulu et al. | 709/224 |
| 6,883,120 | B1 | 4/2005 | Banga | 714/47 |
| 6,898,556 | B2 | 5/2005 | Smocha et al. | 702/186 |
| 6,917,902 | B2 | 7/2005 | Alexander | 702/189 |
| 7,133,805 | B1* | 11/2006 | Dankenbring et al. | 702/186 |
| 2003/0167153 | A1 | 9/2003 | Alexander | 702/189 |
| 2007/0168049 | A1* | 7/2007 | Rao et al. | 700/11 |

OTHER PUBLICATIONS

"Administering SQL Server (SQL Server 2000)—Monitoring with SQL Profiler." Microsoft Corporation. copyright 2008. retrieved from "http://msdn.microsoft.com/en-us/library/aa173918" on Oct. 1, 2008.*
Buneman, O.P. et al., "Efficiently Monitoring Relational Databases", *ACM Transactions on Database Systems*, Sep. 1979, 4(3), 368-382.
Oliver, N.N. et al., "Performance Monitor for a Relational Information System", *Computer Science Department, Research Laboratories*, General Motors Corporation, 329-333.
Rodham, K.J. et al., "Nanites: An Approach to Structure-Based Monitoring", *ACM Transactions on Computer-Human Interaction*, 1997, 4(2), 103-136.
Snodgrass, R. "Monitoring in a Software Development Environment: A Relational Approach", *ACM*, 1984, 124-131.

* cited by examiner

*Primary Examiner*—Robert Beausoliel
*Assistant Examiner*—Philip Guyton
(74) *Attorney, Agent, or Firm*—Woodcock Washburn LLP (57) ABSTRACT A monitoring tool requests traceable information from a server. Such traceable information preferably includes traceable events and associated columns. The monitoring tool preferably generates a display of the traceable information, from which a user may select information to be traced. The monitoring tool requests a trace of the selected information. The trace is preferably displayed to the user, and the user may use the trace to identify and correct problems occurring at the server.

20 Claims, 8 Drawing Sheets

SYSTEM AND METHOD FOR MONITORING THE PERFORMANCE OF A SERVER

REFERENCE TO RELATED APPLICATIONS

This is a continuation of application Ser. No. 10/439,254, filed May 15, 2003 now U.S. Pat. No. 7,155,64.

BACKGROUND OF THE INVENTION

1. Field of the Invention

The present invention relates to the field of service applications and, more specifically, to monitoring the performance and activity of a server.

2. Description of the Prior Art

Monitoring the performance of a server enables administrators to determine if the server is working efficiently and to identify and correct problems affecting performance. For example, a database server may be monitored to identify worst-performing queries, to identify a cause of a deadlock, to monitor stored procedure performance, or to audit server activity.

Generally, a user creates a "template", which is a collection of events and associated columns to be monitored. The user may then launch a trace of a server that requests information for the events and associated columns specified in the template. An event is an action generated within the server such as, for example, the start or end of a stored procedure, the start or end of a statement within a stored procedure, a lock acquired or released on a database object, or an error written to an error log. A column describes the data collected for an associated event. For example, a "binary data" column, when associated with a "lock acquired" event, may include an identifier of a locked page.

A problem related to server monitoring is that the traceable events and columns may vary depending on the type and version of the server to be monitored. Thus, conventional monitoring tools are designed to perform in combination with a particular server type and version. Specifically, conventional monitoring tools may be pre-programmed with all of the traceable events and columns for a corresponding server type and version. Multiple monitoring tools must, therefore, be acquired to perform in combination with different server types and versions.

Thus, there is a need in the art for a monitoring tool that is server and version independent. It is desired that such a tool have the ability to "discover" the traceable events and columns for a connected server and to request and receive a trace of such traceable events and columns.

SUMMARY OF THE INVENTION

Accordingly, systems and methods for monitoring the performance of a server are disclosed. A monitoring tool requests traceable information from the server. The monitoring tool preferably generates a display of the traceable information, from which a user may select information to be traced. The monitoring tool requests a trace of the selected information. The trace is preferably displayed to the user, and the user may use the trace to identify and correct problems occurring at the server.

In an exemplary embodiment of the invention, the monitoring tool may request traceable information by providing a schema to the monitoring tool. The schema preferably includes elements corresponding to traceable events and associated traceable columns. The schema preferably also includes elements corresponding to information about the server such as, for example, a name, description, type, and version of the server.

The elements corresponding to traceable events preferably include a list of traceable event categories, a list of events within each category, and a list of traceable columns associated with each event. Such elements also preferably include information about each event category, event, and associated column. Such information may include, for example, a name, description, type, and identifier.

The elements corresponding to traceable columns preferably include information about each column and characteristics of each column. Such characteristics may include, for example, an indication of whether the column is filterable or repeatable.

In another exemplary embodiment of the invention, the trace may include a header that precedes trace data and provides information about the trace. The trace may also include a field for each selected event. Each such field preferably includes information about the event such as, for example, a length and an identifier of the event. Each such field preferably also includes each selected column associated with the event and information about each column such as, for example, a length and an identifier of the column.

Additional features and advantages of the invention will be made apparent from the following detailed description of illustrative embodiments that proceeds with reference to the accompanying drawings.

BRIEF DESCRIPTION OF THE DRAWINGS

The illustrative embodiments will be better understood after reading the following detailed description with reference to the appended drawings, in which.

DETAILED DESCRIPTION

Systems and methods that meet the above-mentioned objects and provide other beneficial features in accordance with the presently preferred exemplary embodiments of the invention will be described below with reference to aforementioned Figures. Those skilled in the art will readily appreciate that the description given herein with respect to those figures is for explanatory purposes only and is not intended in any way to limit the scope of the invention. Throughout the description, like reference numerals will refer to like elements in the respective figures.

Computer Environment

Figure 1:
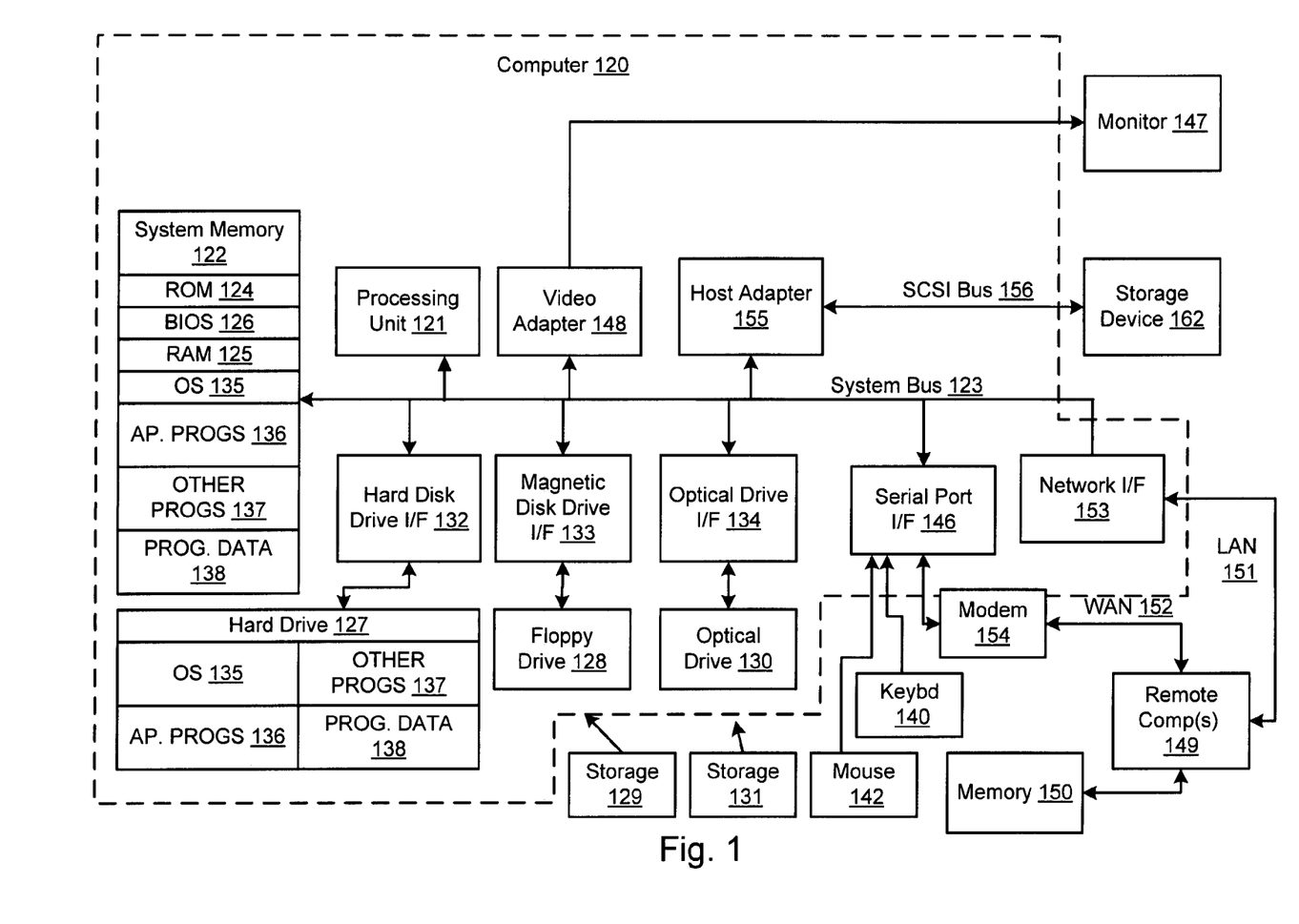
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142 such as a mouse. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Exemplary Systems And Methods of the Present Invention

Generally, a monitoring tool is used to monitor a server. A "discovery" process enables the monitoring tool to be independent of the type and version of the server. During such discovery process, the monitoring tool requests traceable information from the server. A user selects information to be traced from the traceable information, and the monitoring tool requests a trace of the selected information. The trace may be used to determine whether the server is working efficiently and to identify and correct problems affecting performance.

Figure 2:
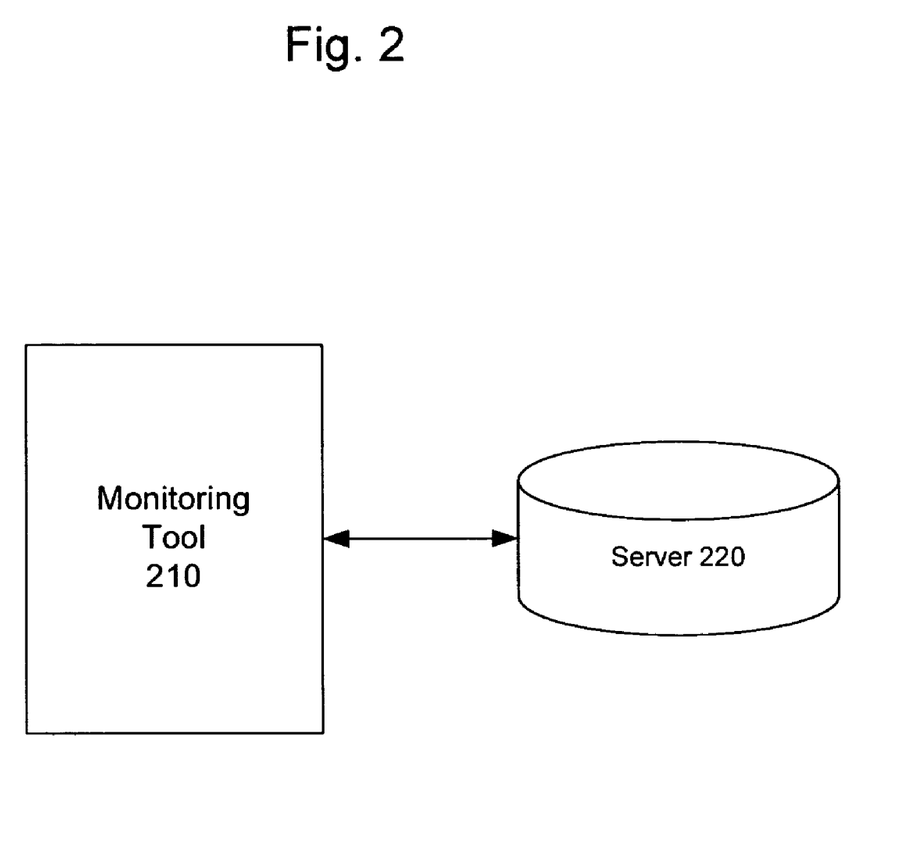
FIG. 2 is a high level block diagram of an exemplary system for monitoring the performance of a server in accordance with the present invention.

A block diagram of an exemplary system for monitoring the performance of a server in accordance with the present invention is shown in FIG. 2. As shown, monitoring tool 210 connects to server 220 and monitors server 220 to determine if server 220 is working efficiently. Monitoring tool 210 is independent of the type and version of server 220. Server 220 may be a server such as, for example a database management system (DBMS) or an online analytical processing system (OLAP) server. As should be appreciated, although only a single server 220 is shown, monitoring tool 210 may be used in connection with any number of servers.

Monitoring tool 210 preferably monitors server 220 by requesting a trace of information from server 220. Such a trace may be displayed to a user. The user may use the trace to identify and correct problems affecting performance at server 220. The trace may also be stored for further processing.

The trace preferably includes traceable events and associated traceable columns. An event is an action generated within server 220 such as, for example, the start or end of a stored procedure, the start or end of a statement within a stored procedure, a lock acquired or released on a database object, or an error written to an error log. A column describes the data collected for an associated event. For example, a "binary data" column, when associated with a "lock acquired" event, may include an identifier of a locked page.

Each event and column is preferably defined as "server defined" or "special". Server defined events and columns are related to server performance and are displayed to the user as part of the trace, while special events and columns are not related to server performance and are not displayed to the user as part of the trace.

Server defined events and columns are specific to the type and version of server 220. Because monitoring tool 210 is independent of the type and version of server 220, monitoring tool 210 is desirably not pre-programmed with server defined events and columns. Rather, monitoring tool 210 preferably requests such server defined events and columns during a "discovery" process. An exemplary discovery process is described in detail below with reference to FIGS. 3-6.

Special events may include "trace special events" and "monitoring tool special events." Trace special events are preferably events associated with the trace. Such events may include, for example, "trace start", "trace stop", "trace error", "trace skipped records", and "trace_nop". "Trace start" indicates the start of tracing and preferably includes an associated "timestamp" column and an associated "traced event" column. "Trace stop" indicates the end of tracing and preferably includes an associated "timestamp" column. "Trace error" indicates a failure associated with server 220 and preferably includes a textual description of such failure. "Trace skipped records" indicates events for which server 220 is unable to provide data. Such inability to provide data may be due to a problem such as, for example, heavy load associated with buffer overflow. "Trace_nop" is preferably provided as an indication to server 220 to flush outgoing buffers.

Monitoring tool special events are preferably events occurring at server 220 that are not related to server performance such as, for example, a "server message".

Special columns may include "trace special columns" and "monitoring tool special columns". Trace special columns are preferably columns associated with the trace. Such columns may include, for example, "traced events", "trace begin record", "trace text filtered", and "trace repeated data". The "traced events" column preferably includes an identifier of a corresponding event and the columns associated with the event. Multiple "traced events" columns are preferably included as part of a "trace start" event. The "traced events" column provides monitoring tool 210 with information about which columns to display as part of the trace.

The "trace begin record" column preferably indicates the beginning of a new event in the trace. The "trace begin record" column is preferably followed by a column indicating a length of the trace begin record column and data associated with the corresponding event.

The "trace text filtered" column indicates that the data corresponding to an event includes sensitive information and is, therefore, filtered out of the trace. The "trace text filtered" column is preferably followed by the name of a stored procedure executed in response to the sensitive information. An associated "text data" column may also be included in the trace to provide text indicating that sensitive information was detected and displaying the name of the executed stored procedure.

The "trace repeated data" column indicates a desired repetition of data from a preceding event. The "trace repeated data" column is preferably followed by a range of column identifiers in which to insert the repeated data. Such repetition is available only for columns specifically defined as repeatable columns.

Monitoring tool special columns are preferably columns associated with server 220 that store data formatting information. Such columns may include "trace column class", "trace grouped columns", "trace ordered columns", "trace filters", and "trace invalid column". "Trace column class" is preferably used to display an event identifier. "Trace grouped columns" is preferably used to preserve column grouping. "Trace ordered columns" is preferably used to preserve column ordering. "Trace filters" provides information about filtered columns. Such filtered columns are desirably defined as filterable. "Trace invalid column" provides information about invalid columns.

"Well known" columns may also be pre-defined by a user as desired.

As set forth above, server defined events and server defined columns are specific to the type and version of server 220. Monitoring tool 210 preferably requests such server defined events and columns during the discovery process. During discovery, monitoring tool 210 provides a schema to server 220. The schema preferably provides a hierarchical framework for the server defined events and columns. The schema preferably also provides a framework for information about server 220. Server 220 receives the schema and formats data accordingly. The formatted data is then submitted to monitoring tool 210. The formatted data may be used to generate a display of the traceable events and columns from which a user may select events and columns to be traced.

Figure 3:
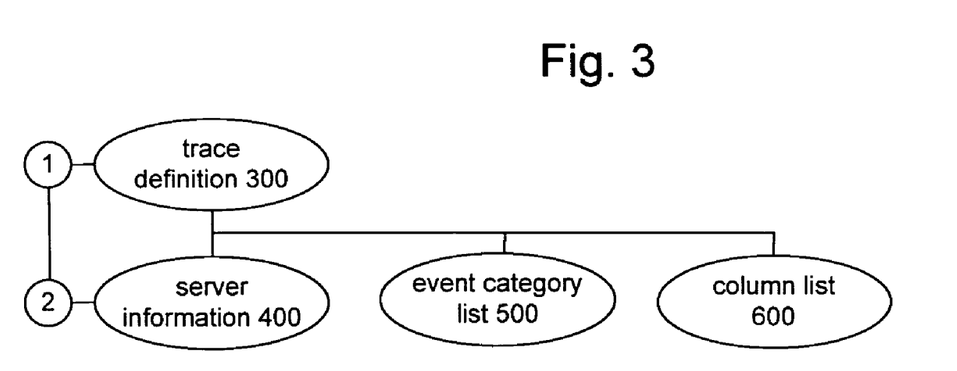
FIG. 3 is a high level block diagram of an exemplary discovery schema in accordance with the present invention.

Block diagrams of an exemplary discovery schema in accordance with the present invention are shown in FIGS. 3-6. FIG. 3 shows a high level block diagram of the exemplary discovery schema, while FIGS. 4-6 each show a particular portion of the exemplary schema. As shown in FIG. 3, trace definition element 300 is a first-level element that includes three second-level elements: server information 400, event category list 500, and column list 600. Server information element 400 provides information about server 220 and is discussed in detail with reference to FIG. 4 below. Event category list element 500 provides information about traceable events and is discussed in detail with reference to FIG. 5 below. Column list element 600 provides information about traceable columns and is discussed in detail with reference to FIG. 6 below.

Figure 4:
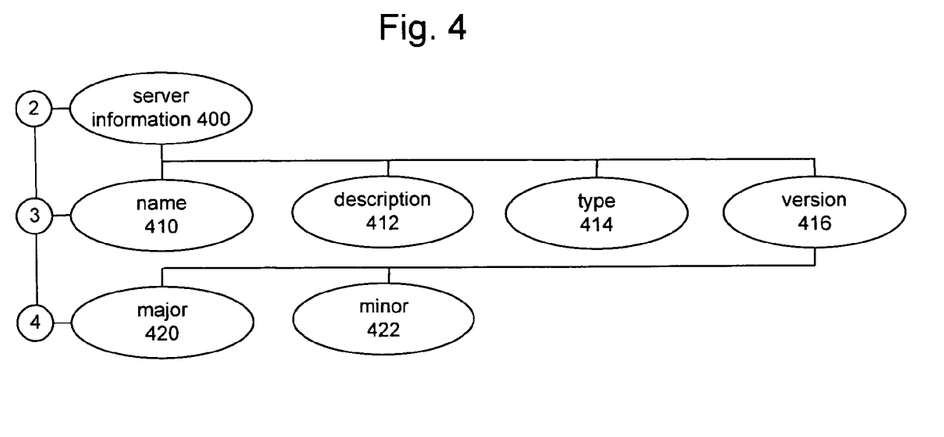
FIG. 4 is a block diagram of a portion of an exemplary discovery schema corresponding to server information in accordance with the present invention.

A block diagram of a portion of an exemplary discovery schema corresponding to server information in accordance with the present invention is shown in FIG. 4. As shown, server information element 400 is a second level element that, in this example, includes four third-level elements: server name 410, server description 412, and server type 414, server version 416. It is contemplated that any number of elements may be included.

Server name 410 is the name assigned to server 220. For example, server name 412 may be "Microsoft SQL Server". Server description 412 may include any text and is preferably a description assigned by a user to identify server 220. Server type 414 may provide further differentiation between server versions. Server version 416 provides information about the version of server 220 and, for example, includes two fourth-level elements: major 420 and minor 422. For example, if a server is version "8.1", then major 420 will be assigned "8" and minor 422 will be assigned "1".

Figure 5:
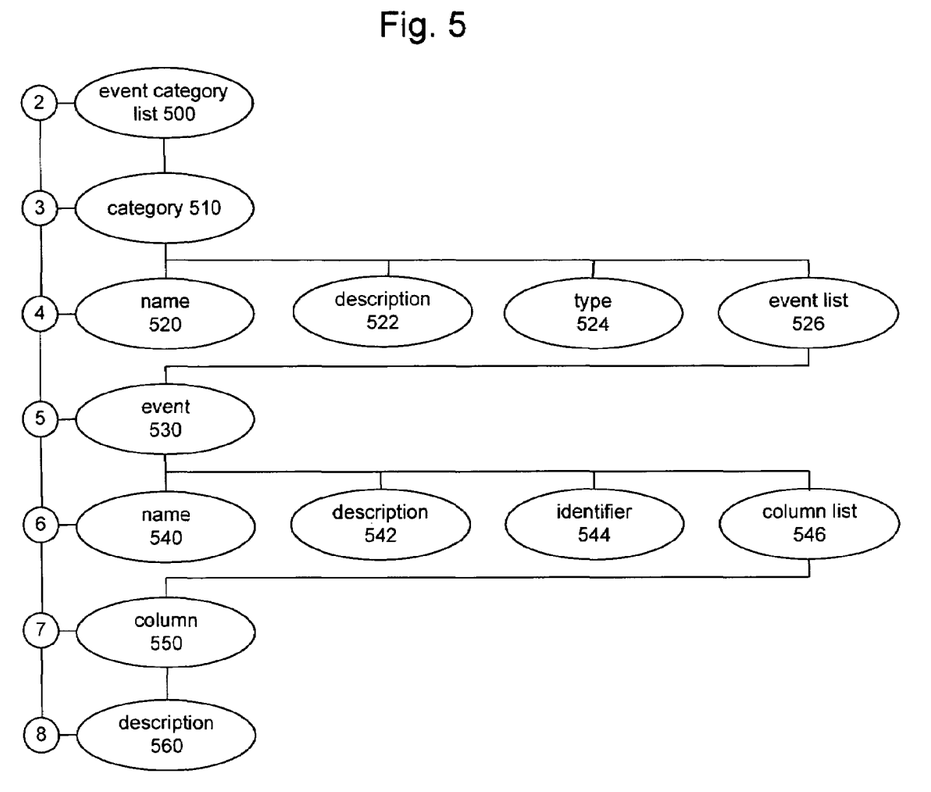
FIG. 5 is a block diagram of a portion of an exemplary discovery schema corresponding to traceable events in accordance with the present invention.

A block diagram of a portion of an exemplary discovery schema corresponding to traceable events in accordance with the present invention is shown in FIG. 5. As shown, event category list 500 is a second level element that comprises a list of traceable event categories at server 220. Each event category is a collection of events related to a particular feature of server 220. For example, a stored procedure category may be a collection of events produced by the execution of stored procedures. A transactional structured query language (TSQL) category may be a collection of events produced by the execution of TSQL statements passed to server 220. A locks category may be a collection of lock related events such as acquisition, cancellation, or release of a lock.

Event category list preferably includes third-level element event category 510. As should be appreciated, although only a single event category element 510 is shown, event category list 500 preferably includes multiple event category elements, each corresponding to a category in the list.

The exemplary event category 510 includes four fourth-level elements: event category name 520, event category description 522, event category type 524, and event list 526. It is contemplated, however, that any number of elements may be included. Event category name 520 is the name assigned to event category 510 such as, for example, "stored procedure", "TSQL", or "locks". Event category description 514 may include any text and is preferably a description assigned by a user to identify event category 510. Event category type 516 preferably provides further detail about the event category. For example, event category type 516 may specify whether the event is a "normal" event, a "significant" event such as, for example, a connection or disconnection, or an "error" event. Such event types may be displayed using a color coding pattern. Event list 526 comprises a list of traceable events in event category 510. For example, a "locks" event category may include events: "acquired", "cancelled", "released", "deadlock", "escalation", and "timeout".

Event list 526 preferably includes fifth-level element event 530. As should be appreciated, although only a single event element 530 is shown, event list 520 preferably includes multiple event elements, each corresponding to an event in the list.

The exemplary event 530 includes four sixth-level elements: event name 540, event description 542, event type 544, and column list 546. It is contemplated, however, that any number of elements may be included. Event name 540 is the name assigned to event 530 such as, for example, "lock acquired". Event description 542 may include any text and is preferably a description assigned by a user to identify event 530.

Event identifier 544 is a unique identifier assigned to event 530. The identifier is preferably a two byte hexadecimal number. The identifier is preferably selected from a range of numbers reserved for server defined events. Other ranges of numbers may be reserved for "trace special events" and "monitoring tool special events" set forth above. Exemplary distributions of identifiers for traceable events are shown below in Table 1:

TABLE 1

| Event | Identifiers |
| --- | --- |
| Trace Special | 0xFBFF-0xFFFE |
| Monitoring Tool Special | 0xF3FF-0xFBFE |
| Server Defined | 0x0001-0xF3FE |

Column list 546 is a list of traceable columns associated with event 530. For example, a "lock acquired" event may have associated columns: "binary data", "duration", "end-time", "event", "index identifier", "integer data", "mode", and "object identifier". Column list 546 preferably includes seventh-level element column 550. As should be appreciated, although only a single column element 550 is shown, column list 546 preferably includes multiple column elements, each corresponding to a column in the list.

The exemplary column 550 comprises a single eighth-level element: column description 560. It is contemplated, however, that any number of elements may be included. Column description 560 may include any text and is preferably a description assigned by a user to identify column 550.

Figure 6:
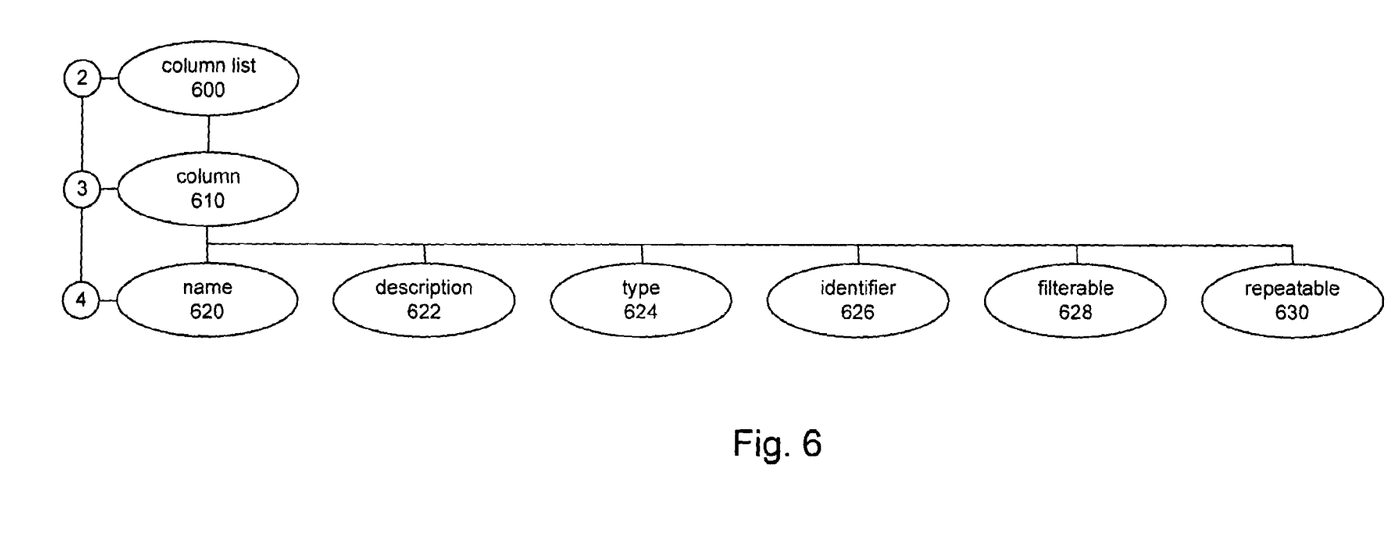
FIG. 6 is a block diagram of a portion of an exemplary discovery schema corresponding to traceable columns in accordance with the present invention.

A block diagram of a portion of an exemplary discovery schema corresponding to traceable columns in accordance with the present invention is shown in FIG. 6. As shown, column list 600 is a second level element that comprises a list of traceable columns at server 220. Unlike column list 546 which includes a list of columns specific to event 530, column list 600 includes a list of all traceable columns for all traceable events.

Column list 600 preferably includes third-level element column 610. As should be appreciated, although only a single column element 610 is shown, column list 600 preferably includes multiple column elements, each corresponding to a column in the list.

Column 610 preferably includes six fourth-level elements: column name 620, column description 622, column type 624, column identifier 626, filterable 628, and repeatable 630. Column name 620 is the name assigned to column 610 such as, for example, "binary data". Column description 622 may include any text and is preferably a description assigned by a user to identify column 610. Column type 624 is defines how data in the column is stored and interpreted. For example, column type 624 defines whether data is stored as an integer or a string.

Column identifier 626 is a unique identifier assigned to column 530. The identifier is preferably a two byte hexadecimal number. The identifier is preferably selected from a range of numbers reserved for server defined columns. Other ranges of numbers may be reserved for "trace special columns", "monitoring tool special columns", and "well known columns". Exemplary distributions of identifiers for traceable columns are shown below in Table 2:

TABLE 2

| Column | Identifiers |
| --- | --- |
| Trace Special | 0xFBFF-0xFFFE |
| Monitoring Tool Special | 0xF7FF-0xFBFE |
| Well Known | 0xF3FF-0xF7FE |
| Server Defined | 0x0001-0xF3FE |

Filterable element 628 provides an indication of whether a filter operation corresponding to a data type may be applied to column 610. Filterable columns may be filtered during execution of a trace in response to a condition such as, for example, the detection of sensitive information. The application of such a filter in response to sensitive information is preferably indicated in the "trace text filtered" trace special column set forth above. Filterable columns may also be filtered when trace data is manipulated by the user at monitoring tool 210.

Repeatable element 630 provides an indication of whether column 610 is repeatable. Server 220 desirably need not resend data corresponding to a repeatable column in a subsequent trace. If a repeatable column is selected to be repeated, then it is indicated in the "trace repeated data" trace special column set forth above.

Thus, an exemplary discovery schema has been set forth above with reference to FIGS. 3-6. The exemplary schema provides a framework for server defined events and columns as well as information about the server. The exemplary schema enables monitoring tool 210 to discover traceable events and columns specific to the type and version of server 220. Once the monitoring tool discovers such traceable information, the user may select events and columns to be traced, and a request for a trace of the selected events and columns is sent to server 220.

Figure 7:
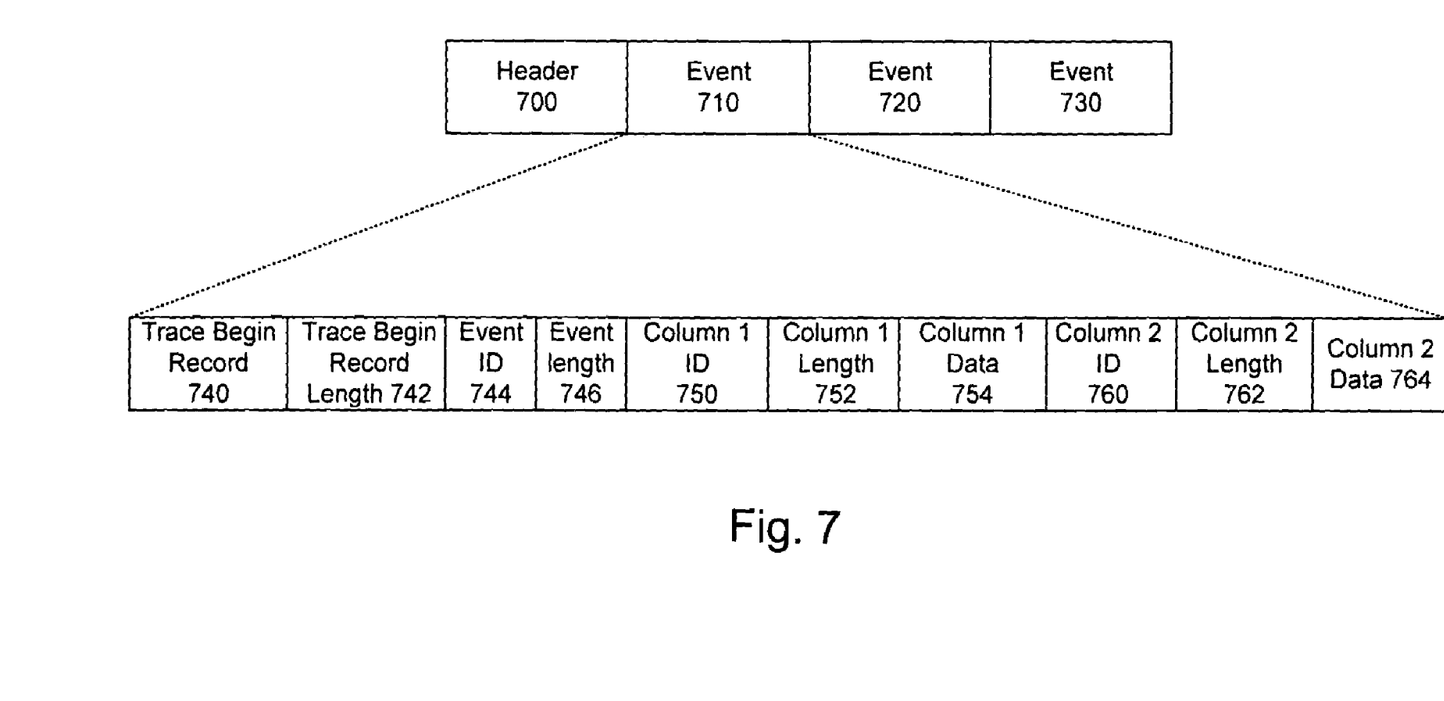
FIG. 7 is a block diagram of an exemplary trace in accordance with the present invention.

A block diagram of an exemplary trace in accordance with the present invention is shown in FIG. 7. As shown, the exemplary trace includes header 700 and a series of selected events 710-730. As should be appreciated, although three events 710, 720, and 730 are shown, the exemplary trace may include any number of selected events.

Header 700 preferably precedes selected events 710-730 and provides information about the trace. Header 700 preferably includes information such as, for example, a trace identifier, a trace length, a trace file version, a general server name, a definition type, a major and minor server version , a build number, a file rollover options value bit-mask, a specific server name, and a trace repeated base column identifier.

The trace identifier, trace length, and trace file version are preferably two byte hexadecimal numbers. The general server name, definition type, and server version are provided in the server information portion of discovery set forth above with reference to FIG. 4. The build number is preferably an incremental number which is increased when a binary module of server 220 is compiled. File rollover enables a new file with a common base name and sequential number to be opened when a previous file is filled. Specific server name is a specific name assigned to server 220. Trace repeated base column identifier indicates which column will be repeated.

Series of events 710-730 includes data for each selected event. The data field for event 710 is described herein in detail. As should be appreciated, although only an exemplary event 710 is shown in detail, data for events 720 and 730 is preferably similarly formatted.

Data for event 710 is initiated by a "trace begin record" special column 740 which is followed by a trace begin record length 742. The trace begin record length is preferably fixed at "6" for all events. Data for event 710 also includes an event identifier field 744 and an event length field 746. Event identifier 804 is the identifier of event 710 and is preferably assigned during discovery. Event length is preferably a four byte number that indicates the length of the data for event 710.

Data for event 710 also includes data for each selected column associated with event 710. In the exemplary trace, data for two selected columns, "column 1" and "column 2", is provided. As should be appreciated, however, although only two associated columns are selected in the exemplary trace, any number of associated columns may be selected by a user and included in the trace. Data for each of selected columns 1 and 2 includes a column identifier 750 and 760, a column length 752 and 762, and column data field 754 and 764, respectively.

Figure 8:
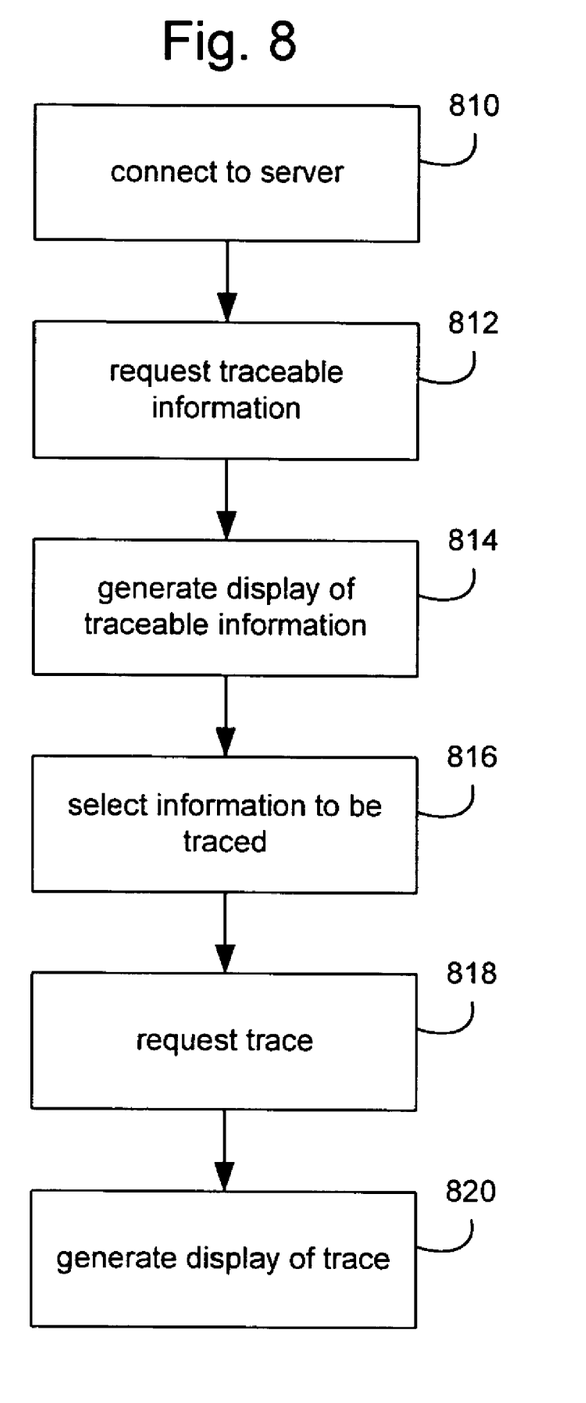
FIG. 8 is a flowchart of an exemplary method for monitoring the performance of a server in accordance with the present invention.

Thus, an exemplary trace format has been disclosed above with reference to FIG. 7. The exemplary format includes information about selected events and selected associated columns. Such information is used to monitor the performance of server 220. A flowchart of an exemplary method for monitoring the performance of a server in accordance with the present invention is shown in FIG. 8.

Generally, during discovery, monitoring tool 210 requests traceable information from server 220. Monitoring tool 220 preferably generates a display of the traceable information, from which a user may select information to be traced. The monitoring tool requests a trace of the selected information. The trace is preferably displayed to the user, and the user may use the trace to identify and correct problems occurring at server 220.

At step 810, monitoring tool 210 connects with server 220, and, at step 812, monitoring tool 210 requests traceable information from server 220. An exemplary protocol for requesting traceable information from server 220 is set forth above with reference to FIGS. 3-6. Generally, monitoring tool 210 may provide a schema that serves as a hierarchical framework for such traceable information, and server 220 formats data according to the schema and submits the formatted data to monitoring tool 210.

The schema preferably includes elements corresponding to traceable events and associated columns. The schema preferably also includes elements corresponding to information about server 220 such as, for example, a name, description, type, and version of server 220.

The elements corresponding to traceable events preferably include a list of traceable event categories, a list of events within each category, and a list of traceable columns associated with each event. Such elements also preferably include information about each event category, event, and associated column. Such information may include, for example, a name, description, type, and identifier.

The elements corresponding to traceable columns preferably include information about each column and characteristics of each column. Such characteristics may include, for example, an indication of whether the column is filterable or repeatable.

At step 814, monitoring tool 210 generates a display of the traceable information. Step 814 is an optional step. Alternatively or in addition to displaying the traceable information, monitoring tool 210 may print the traceable information or store the traceable information for further processing.

The display of traceable information is preferably a grid including traceable events and associated columns. The grid may group traceable events by event category. An exemplary grid display for an exemplary event category, "locks", is shown below in Table 3:

TABLE 3

|  | binary data | duration | end-time | event | index identifier | integer data | mode | Object identifier |
|---|---|---|---|---|---|---|---|---|
| acquired | * | * | * | * | * |  | * | * |
| cancelled | * | * | * | * | * |  | * | * |
| released | * | * | * | * | * | * | * | * |
| deadlock | * |  |  | * | * | * | * | * |
| escalation |  |  |  | * | * |  | * | * |

TABLE 3-continued

|  | binary data | duration | end-time | event | index identifier | integer data | mode | Object identifier |
|---|---|---|---|---|---|---|---|---|
| timeout | * | * | * | * | * |  |  | * |
| deadlock chain | * | * | * | * | * |  | * | * |

Table 3 lists each traceable event in the exemplary "locks" event category in the left-most column. Table 3 lists each traceable column associated with the "locks" event category in the top row. An asterisk indicates that a column is associated with a particular event. For each selected event, the user may select only the event columns with an asterisk in the appropriate row.

At step 816, the user selects information to be traced. For example, the user may select, from the locks event category, the lock acquired event and the binary data column.

At step 818, a request is sent to server 220 for a trace providing the information selected at step 816. The trace may be provided only once or periodically at intervals specified by the user.

An exemplary trace protocol is set forth above with reference to FIG. 7. Generally, the trace protocol includes a header that precedes trace data and provides information about the trace. The trace then includes a field for each selected event. Each event field is initiated with a "trace begin record" special column and includes information about the event. Each event field also includes each selected associated column and information about such columns.

At step 820, monitoring tool generates a display of the trace. Step 820 is an optional step. Alternatively or in addition to displaying the trace, monitoring tool 210 may print the trace or store the trace for further processing. The user may use the trace to identify and correct problems affecting performance at server 220.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather should be construed in breadth and scope in accordance with the appended claims.

We claim:

1. A method for monitoring a server, the method comprising:
    requesting traceable information from the server by providing a schema to the server as part of a discovery process, wherein the schema is a hierarchical framework for traceable information and includes elements corresponding to traceable events and associated traceable columns and wherein a first portion of the events and columns relate to server performance and a second portion of the events and columns are not related to server performance;
    in response to the provided schema, receiving traceable information from the server, wherein the traceable information indicates information unique to the server capable of being traced;
    selecting information to be traced from the traceable information; and
    requesting a trace of the selected information
    displaying a trace of the selected information wherein the first portion is displayed and the second portion is not displayed.

2. The method of claim 1, wherein requesting traceable information comprises requesting information about the server.

3. The method of claim 1, wherein an event is an action generated within the server.

4. The method of claim 3, wherein a column describes data collected for an associated event.

5. The method of claim 4, wherein selecting information to be traced comprises:
    generating a grid display including the traceable events and the traceable columns, the grid display identifying the traceable columns associated with each traceable event; and
    selecting the grid events and columns to be traced.

6. The method of claim 1, further comprising displaying the trace.

7. The method of claim 1, further comprising identifying an event at the server based on the trace.

8. The method of claim 1, further comprising storing the trace at a monitoring tool for further processing.

9. A system for monitoring a server, the system comprising:
    a processor operative to execute computer executable instructions; and
    memory having stored therein computer executable instructions for performing the following steps:
        requesting traceable information from the server as part of a discovery process by providing a schema to the server, wherein the schema is a hierarchical framework for traceable information;
        selecting information to be traced from the traceable information; and
        requesting a trace of the selected information.

10. The system of claim 9, wherein the traceable information comprises information about the server.

11. The system of claim 9, wherein the traceable information comprises traceable events occurring at the server.

12. The system of claim 11, wherein the traceable information further comprises traceable columns, the traceable columns being associated with the traceable events and including data describing the traceable events.

13. The system of claim 12, further comprising a display device for displaying a grid including the traceable events and the traceable columns, the grid identifying the traceable columns associated with each traceable event.

14. The system of claim 13, wherein the display device is further for displaying the trace.

15. The system of claim 9, wherein the memory is further for storing the results of the trace for further processing.

16. A computer-readable medium having stored thereon computer executable instructions for monitoring a server, the instructions comprising:

requesting traceable information from the server by providing a schema to the server as part of a discovery process, wherein the schema is a hierarchical framework for traceable information;

in response to the provided schema, receiving traceable information from the server, wherein the traceable information indicates information unique to the server capable of being traced;

selecting information to be traced from the traceable information; and     requesting a trace of the selected information.

17. The computer readable medium of claim 16, wherein requesting traceable information comprises requesting information about the server.

18. The computer readable medium of claim 16, wherein requesting traceable information comprises requesting traceable events occurring at the server.

19. The method of claim 18, wherein requesting traceable events occurring at the server comprises requesting traceable columns, the traceable columns being associated with the traceable events and including data describing the traceable events.

20. The computer readable medium of claim 19, wherein selecting information to be traced comprises:

generating a grid display including the traceable events and the traceable columns, the grid display identifying the traceable columns associated with each traceable event; and     selecting the grid events and columns to be traced.

* * * * *